United States Patent [19]

Viaud

[11] Patent Number: 5,247,775
[45] Date of Patent: Sep. 28, 1993

[54] BINDER ARRANGEMENT FOR THE BALES OF A BALER

[75] Inventor: Jean Viaud, Sarreguemines, France

[73] Assignee: Deere & Company, Moline, Ill.

[21] Appl. No.: 757,159

[22] Filed: Sep. 10, 1991

[30] Foreign Application Priority Data

Oct. 16, 1990 [DE] Fed. Rep. of Germany ....... 4032788

[51] Int. Cl.⁵ ............................................ B65B 11/04
[52] U.S. Cl. ....................................... 53/556; 53/118;
 53/587; 53/389.3; 53/389.4
[58] Field of Search ................. 53/118, 556, 587, 588,
 53/389.2, 389.3, 389.4

[56] References Cited

U.S. PATENT DOCUMENTS

| | | | |
|---|---|---|---|
| 4,580,398 | 4/1986 | Bruer | 53/587 X |
| 4,656,812 | 9/1987 | Busse | 53/118 X |
| 4,697,402 | 10/1987 | Anstey | 53/587 X |
| 4,729,213 | 3/1988 | Raes | 53/556 X |
| 4,779,526 | 10/1988 | Frerich | 53/118 X |

Primary Examiner—John Sipos

[57] ABSTRACT

A round baler includes a bale chamber defined in part by a plurality of belts mounted between opposite side walls of the baler and including an upright run located at the rear of the baler side walls and joined to a fore-and-aft extending run located at the bottom of the baler side walls. A binder arrangement is mounted to the rear and bottom of the side walls and includes a pair of feed rollers disposed in such close proximity to the upright runs of the belts that the kinetic energy imparted to the web of binder material being conveyed by the rollers carries it into contact with the upper run of belts which then carry the binder material downwardly into a fore-and-aft extending guide track that leads to the baling chamber. The binder arrangement includes cutting arrangement defined by a movable knife and a stationary counter knife, the movable knife being mounted for movement between a rest position located above a tangent extending from a passage formed by the rollers and forwardly of an upper one of the rollers, and a cut-off position located below the tangent and forwardly of a lower one of the rollers and the counter knife being mounted adjacent said cut-off position.

9 Claims, 2 Drawing Sheets

BINDER ARRANGEMENT FOR THE BALES OF A BALER

BACKGROUND OF THE INVENTION

The invention concerns a binder arrangement for cylindrical bales formed by a baler having a conveying arrangement with two rollers that deliver a web of binding material, such as plastic sheeting or net, to a baling chamber, which is partially defined by belts, chains or the like, where at least one of the rollers can be driven and the rollers provide a passage between themselves through which the binding material is guided.

In a known round baler (GB-A-2,212,440) binding material consisting of a web of mesh or plastic film is drawn between two rollers of a conveying arrangement and guided through a guide track to a baling chamber where it is wound around a bale. In order to overcome the distance between the rollers and the guide track, a blower is provided which brings the binding material into contact with the belts which draw it into the guide track.

The problem underlying the invention is seen as that of developing a baler in which the binding material reaches the guide track without the assistance of a blower.

SUMMARY OF THE INVENTION

According to the present invention, there is provided a binder arrangement including a pair of feed rollers which bring the binding material into direct contact with the bale chamber forming belts.

Specifically, in accordance with the principles of the present invention there is provided a pair of feed rollers which are located such that the centrifugal force imparted by the rollers to the binding material is sufficient to bring it into contact with the belts, which convey it over a guide track into the baling chamber. In order to avoid any divergent motion of the binding material as it leaves the rollers, a guide vane may be provided, which leads the binding material to the belts. The trajectory of the wrap material as it leaves the rollers may be influenced by operating the rollers at different speeds. Also, in order to ensure that there is no slip between the rollers thereby ensuring a substantially constant transmission of kinetic energy to the binding material, at least one of the rollers has its circumferential surface covered with rubber. The web of binding material is maintained in a spread out condition along the length of the rollers by means of helical grooves or protrusions provided along at least one roller. Cutting of the binding material is achieved by a cutter arrangement including a movable knife blade which moves on an arc from a home position above the guide vane to a cutting position traversing the path that the binding material takes once it is caught between the belts and the guide track, a counter knife blade being fixed below the binding material path and cooperating with the movable knife blade to sever the binding material.

DESCRIPTION OF THE PREFERRED EMBODIMENT

Figure 1:
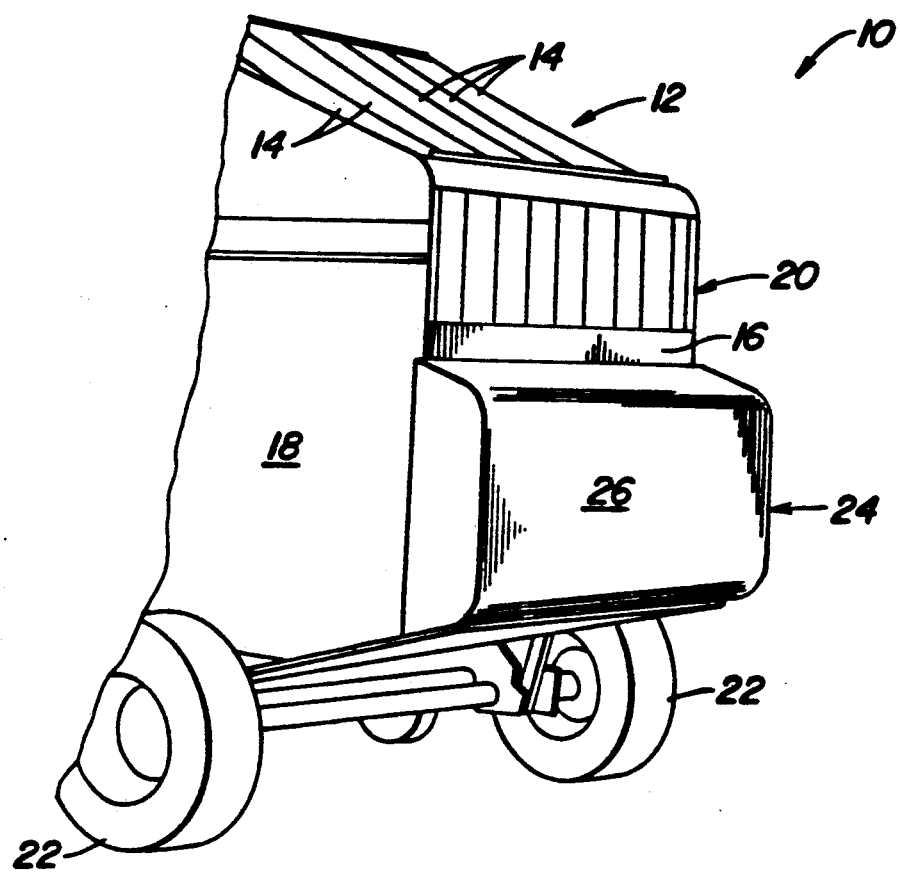
FIG. 1 is a left rear perspective view of a baler of the type with which the present invention is particularly adapted for use.

Referring now to FIG. 1, there is shown a round baler 10 of type having an interior baling chamber 2 bounded partially by a plurality of belts 14 and partially by opposite side walls 18 and 20, upright rear edges of the latter having a panel or rising wall 16 fixed thereto. The baler 10 is supported for movement across the ground by a pair of ground wheels 22. Carried at the rear of the baler 10, adjacent to the wall 16, is a binder arrangement 24, whose details are illustrated in FIG. 2.

The baler 10 as thus far described is conventional and is used to take up crop deposited on the ground and to compact it into cylindrical bales in order to make the crop easy to handle for any further use. After the crop has been compacted in the baling chamber 12, it is bound and deposited on the ground. The configuration of the baler 10 as a mobile baler represents only one possible variation and it is to be understood that the invention described herein may be used in stationary balers for compacting industrial materials such as paper, rags, cotton excelsior and the like.

Figure 2:
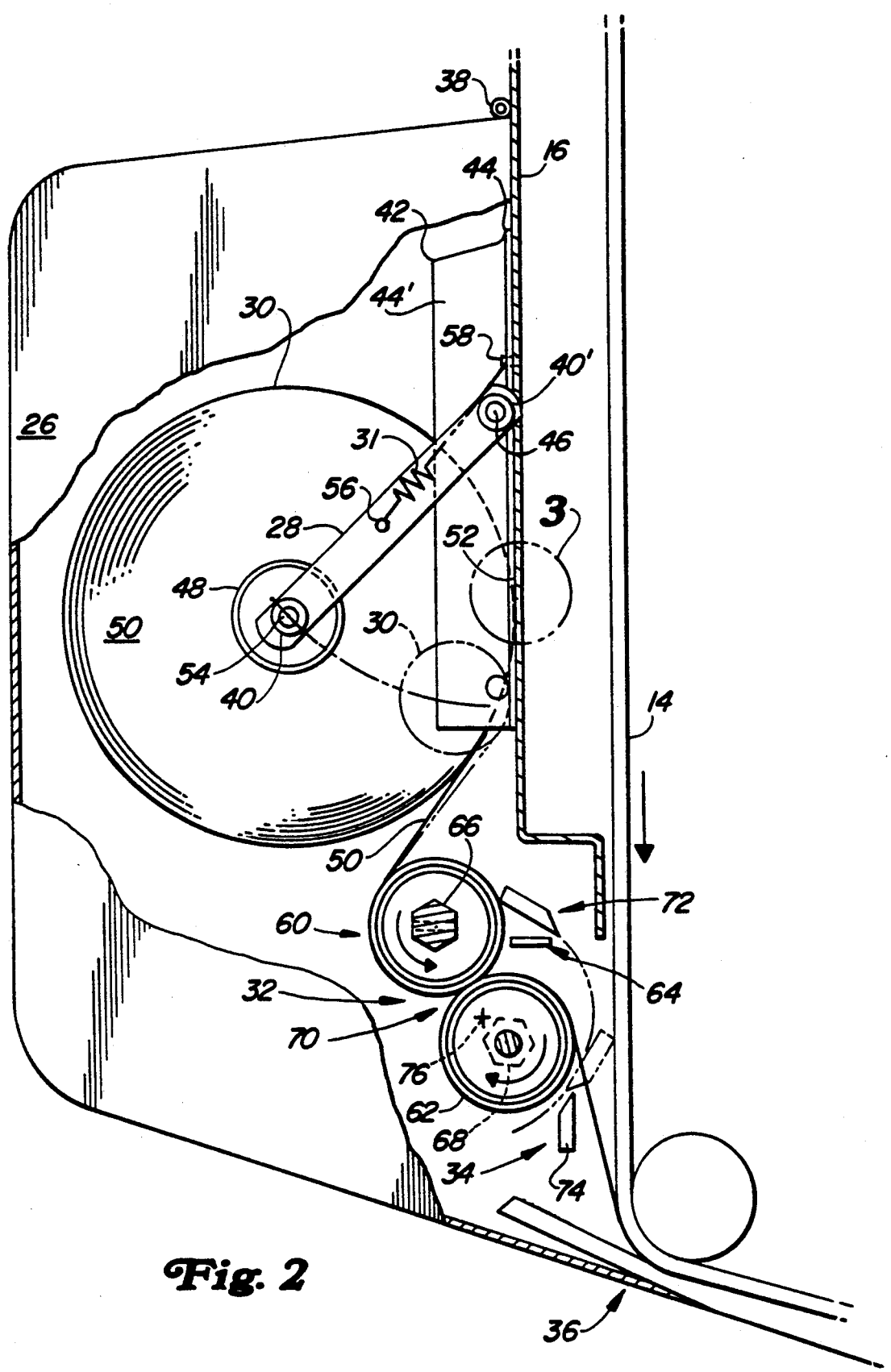
FIG. 2 is a right side elevational view showing the binder arrangement of the present invention.

The binder arrangement 24, as shown for this embodiment in FIG. 2, is enclosed by a box-like cover 26, and contains arms 28, a spool 30, an energy storage device 31, a conveying arrangement 32, a cutter arrangement 34 and a guide track 36. The cover 26 is attached to the wall 16 by means of a hinge joint 38, so as to pivot vertically, and protects the entire binder arrangement 24 from dirt and outside influences.

The arms 28 are formed from profiled sections, with a length that exceeds the greatest possible radius of the spool 30 by approximately one quarter. At both their ends the arms 28 are provided with bearings 40, 40' that permit the arms 28 to pivot freely. The bearing 40 accommodates the spool 30, free to rotate. For the attachment of the arms 28 at the wall 16, an angle iron 42 is provided, with one of its legs 44 being fastened to the wall 16 and with the other of its legs 44' accommodating the bearing 40'; for this purpose a bearing pin 46 extends perpendicular to the plane of the drawing from the leg 44'. As can be seen, the arms 28 can pivot in the plane of the drawing about the bearing pins 46.

The spool 30 is composed of a carrier 48 and binding material 50, and comes into contact at the wall 16 on a part of its circumferential surface with a surface 52. FIG. 2 shows the spool 30 in both of its end positions and with its associated outside diameters. The carrier 48 may consist of a pipe of cardboard, plastic or metal, at whose ends journals 54 are attached that engage the bearings 40. The binding material 50 is spooled onto the carrier 48 and is used to bind the bale formed in the baling chamber 12. As is known, plastic film, mesh, twine, paper or the like may be used as binding material 50. While the binding material 50 is conducted through the guide track 36 to the baling chamber 12, and is there drawn along by the bale, the spool 30 with the journal 54 of the carrier 48 rotates in the bearing 40, and decreases its outside diameter. Due to the reduction in outside diameter the distance between the axis of rotation of the spool 30 pivots with the arms 28 about the bearing pins 46 in order to come into contact with the surface 52 at the wall 16.

Figure 3:
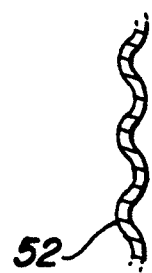
FIG. 3 is an enlargement of the circled area 3 appearing in FIG. 2

The surface 52 may be painted sheet metal or may also be provided with a coating of rubber or the like with a high coefficient of friction. Alternatively, the surface 52 may have a wave form, as can be seen in FIG. 3 (this illustration has been enlarged by a factor of two). Finally the surface 52 may be provided with various coatings, which come into contact with the spool 30 progressively with the changing position of the latter. As can be seen in FIG. 2, the contact region of the spool 30 with the surface 52 moves downward as its outside diameter is reduced. Accordingly a friction coating with a higher coefficient of friction at a location lower on the surface 52 can balance the decreasing friction force that results from the weight of the spool 30.

The energy storage device 31 is formed in this embodiment by mechanical tension springs, one end of which engages a pin 56 on the arms 28, while the other end engages a pin 58 on the angle iron 42. The position of the pins 56 and 58 is selected in such a way that they lie in a straight line with the bearing pin 46 when the spool 30 is in a position between its left most and its right most position. In this intermediate position, which also represents a dead center position, the energy storage device 31 experiences its greatest tension, and can decrease this tension to either side of the intermediate position as it rotates the arms 28 with the spool 30 about the bearing pins 46. The further the arms 28 are moved from the intermediate position, the greater is the distance from the imaginary line through the pins 56, 58 to the center of the bearing pin 46, and therewith the size of the moment arm through which the energy storage device 31 can act upon the arms 28.

As can be seen, after passing the intermediate position in a counterclockwise direction the energy storage device 31 tends to reduce in length, and thereby forces the spool 30 or the binding material spooled onto it against the surface 52. After passing the intermediate position in the clockwise direction, the energy storage device 31 does shorten, but thereby it lifts the spool 30 and hence the contact pressure of the binding material 50 on the surface 52. Accordingly a balance is created by the energy storage device 31 between the changing friction force to either side of the intermediate position due to the weight of the spool 30.

The conveying arrangement 32 is formed by an upper roller 60 and a lower roller 62 between which the binding material 50 is guided, and a guide vane 64. The upper roller 60 is coated with rubber on its outer circumference, and hence exhibits a high coefficient of friction on its outer circumference. The upper roller 60 is driven in the direction of the indicated arrow by a drive arrangement, not shown, as is well known; for this purpose it is rigidly attached to a shaft 66.

The lower roller 62 is supported for free rotating on a shaft 68 in the walls 18 and is usually not driven directly but is rotated by the friction exerted upon it by the upper roller 60. The circumferential surface of the lower roller 62 is smooth over almost all of its surface, so that it can be made from metal or a hard plastic. If required, the lower roller 62 may be driven, particularly at a higher circumferential speed than the upper roller 60. Finally, the axial ends of the lower roller 62 are provided with helical grooves, which effect a stretching of the binding material 50 towards the axial ends of the rollers 60, 62 during their rotation. Between them, the rollers 60, 62 define a passage 70 through which the binding material 50 is carried.

The rollers 60, 62 are arranged in such a way that a common tangent to the two rollers 60, 62 running through the passage 70 is directed generally perpendicular to the principal plane of the belts 14, or even at an upward angle to the belts. The distance from the rollers 60, 62 to the principal plane of the belts 14 is selected so that the binding material 50 can easily come into contact with the belts immediately after leaving the passage 70 and is pulled along by these, as soon as it is drawn by the now rotating rollers 60, 62 from the carrier 48. If the lower roller 62 is rotated at a higher circumferential speed than the upper roller 60, the binding material is moved upward away from the tangent by reason of the speed difference.

The guide vane 64 is arranged above the tangent running through the passage 70 and approximately parallel thereto, where its guide surface is oriented approximately perpendicular to the principal plane of the belts 14 in their adjoining region. By these means the binding material 50, after leaving the passage 70, slides along the underside of the guide vane 64, is so guided to the belts 14 and finally comes into contact with them. Arrangements known from the state of the art, for bringing the binding material 50 into contact with the belts 14, by the use of compressed air or other mechanical means, are therefore not necessary, since the binding material 50 is brought into contact with the belts 14 by the rollers 60, 62 themselves.

The cutter arrangement 34 contains a knife 72 and a counter knife 74 and is used to cut the binding material 50 that is wound around the bale from the binding material 50 remaining on the spool 30, as soon as the bale is bound tightly enough. The cutter arrangement 34 is located in the immediate vicinity of the conveying arrangement 32 and is operated either manually or automatically. The length and principal orientation of the knife 72 and the counter knife 74 correspond to that of the rollers 60 and 62.

The knife 72 is configured as a casting with a cutting edge 72' inset at the lower region, and can move on a carrier, not shown, about a pivot point 76. This movement occurs in the space between the rollers 60 and 62 and the belts 14. During the movement the knife 72 crosses the binding material 50 that extends up to the belts 14, and engages it. In this preferred embodiment the knife 72 occupies a rest position above the passage 70 and in the vicinity of the upper roller 60 and moves into a cutting position below the passage 70 in the lower region of the lower roller 62. The counter knife 74 is stationary and is fastened to the walls 18, 20 by means not shown. It is also configured as a casting with an inset cutting edge 74', which is arranged on the side towards the knife 72. During the cutting, shearing or separating process, the two cutting edges 72', 74' slide past each other.

According to the preceding, the operation of the conveying arrangement 32 and cutting arrangement of the binder arrangement 24 proceeds as follows. Upon the completion of the formation of a bale in the bale chamber 12, a manual or automatic signal is initiated which causes a drive for the roller 60 to be effected. The wrap material 50 located in the passage 70 between the rollers 60, 62 then has kinetic energy imparted thereto due to the rotation of the rollers and is caused to be propelled against the guide vane 64 which deflects the material into contact with the belts 14. The belts 14 then carry the binder material 50 into contact with the guide track 36 which serves to guide the material into the bale chamber 12 where it is engaged by the rotating bale. Once the bale is sufficiently bound by material 50, a manual or automatic signal is initiated to effect operation of a knife drive that moves the knife 72 on its carrier in a circle arc about the pivot point 76 from the rest or home position downward to the cutting position. During this movement, the knife 72 encounters the binding material 50 shortly before it reaches the counter knife 74. At this point, the binding material 50 extends to the belts 14 and is stretched around the lower roller 62, and is being drawn into the guide track 36 by the bale rotating in the baling chamber 12. During the further course of the operation, the binding material 50 is drawn to the counter knife 74 and sheared off between the two cutting edges 72', 74'. The cut end of the binding material 50 is drawn into the baling chamber 12 by the bale and there wrapped fully around the bale. After the cutting operation, no further pull is applied to the remaining binding material 50 spooled on the spool 30, and the upper roller 60 is no longer driven. Accordingly, the unspooling of binding material 50 from the spool 30 ends immediately after the cutting operation. In particular, the spool 30 is prevented from any overrunning by reason of its contact with the surface 52.

I claim:

1. In a combination of a round baler binder arrangement wherein the baler includes a baling chamber bounded in part by a pair of side walls and in part by a plurality of belts disposed side-by-side between the side walls and each having an upright run moving downwardly located between a rear end of the side walls and joined to a forwardly moving fore-and-aft extending run located between a lower part of the side walls; and the binder arrangement includes a guide track mounted to the side walls below said upright run in close proximity to the fore-and-aft extending run and includes a conveying arrangement comprising a pair of feed rollers supported by the side walls in a location rearwardly of the upright run and forming a passage between them through which a web of binder material is guided, with at least one of the feed rollers being selectively driven, for imparting kinetic energy to the web of binder material for carrying it towards the baling chamber, the improvement comprising: said rollers being located such that a tangent of the two rollers passing between the rollers in said passage extends to said belts and wherein the angle defined by the tangent and a portion of the upright run extending upwardly from an intersection of the tangent with the upright run is an obtuse angle.

2. The combination of a baler and binder arrangement defined in claim 1 wherein said tangent extends substantially perpendicular to said upright run of the belts.

3. The combination of a baler and binder arrangement defined in claim 1 wherein a guide vane intersects said tangent at an angle for directing binder material into contact with the upright run of said belts.

4. The combination of a baler and binder arrangement defined in claim 1 wherein at least one of the rollers is provided with a rubber coating that exhibits a high coefficient of friction.

5. The combination of a baler and binder arrangement defined in claim 1 wherein at least one of the rollers is provided on its circumferential surface with helical means for engaging the binder material and maintaining it spread across the length of said at least one of the rollers.

6. The combination of a baler and binder arrangement defined in claim 1 wherein said binder arrangement includes a cutting arrangement including a movable knife mounted for pivotal movement between a rest position adjacent a first of the rollers and above said tangent and a cut-off position adjacent a second one of the rollers.

7. The combination of a baler and binder arrangement defined in claim 6 wherein a space defined between the upright runs of the belts and the second one of the rollers is substantially filled by the movable knife when the latter is in said cut-off position.

8. The combination of a baler and binder arrangement defined in claim 1 wherein one of the feed rollers is located above and rearwardly of the other; and said binder arrangement including cutting arrangement including a movable knife mounted for movement along an arc extending from a first location forwardly of the upper one of the feed rollers and above said tangent to a second location forwardly of the lower one of the rollers and beneath said tangent.

9. The combination of a baler and binder arrangement defined in claim 8 wherein said cutting arrangement includes a stationary counter knife located adjacent said second location.

* * * * *